US008819585B2

(12) United States Patent
Sareen et al.

(10) Patent No.: US 8,819,585 B2
(45) Date of Patent: *Aug. 26, 2014

(54) CHILD WINDOW SURFACING AND MANAGEMENT

(75) Inventors: Chaitanya Dev Sareen, Seattle, WA (US); Gregory Alexander Lett, Bellevue, WA (US); Tony Edward Schreiner, Bellevue, WA (US); Helen Elizabeth Drislane, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 645 days.

This patent is subject to a terminal disclaimer.

(21) Appl. No.: 12/259,169

(22) Filed: Oct. 27, 2008

(65) Prior Publication Data

US 2010/0107115 A1 Apr. 29, 2010

(51) Int. Cl.
*G06F 3/048* (2013.01)
*G06F 3/0481* (2013.01)
*G06F 9/44* (2006.01)

(52) U.S. Cl.
CPC .......... *G06F 3/0481* (2013.01); *G06F 3/04817* (2013.01); *G06F 9/4443* (2013.01)
USPC ............................. 715/804; 715/838; 715/779

(58) Field of Classification Search
USPC ............................ 715/779, 783, 804, 805, 838
See application file for complete search history.

(56) References Cited

U.S. PATENT DOCUMENTS

| | | | |
|---|---|---|---|
| 5,889,522 A | 3/1999 | Chew et al. | |
| 5,995,101 A * | 11/1999 | Clark et al. | 715/711 |
| 6,232,971 B1 | 5/2001 | Haynes | |
| 6,996,782 B2 * | 2/2006 | Parker et al. | 715/764 |
| 7,596,760 B2 * | 9/2009 | Sauve et al. | 715/777 |
| 8,307,300 B1 * | 11/2012 | Fisher et al. | 715/800 |
| 2002/0163545 A1 * | 11/2002 | Hii | 345/838 |
| 2003/0117440 A1 * | 6/2003 | Hellyar et al. | 345/767 |
| 2005/0091096 A1 * | 4/2005 | Coates et al. | 705/8 |
| 2006/0036962 A1 | 2/2006 | Jobs et al. | |
| 2006/0061597 A1 * | 3/2006 | Hui | 345/629 |

(Continued)

FOREIGN PATENT DOCUMENTS

EP 1669848 A2 6/2006

OTHER PUBLICATIONS

Firefox Showcase, "Tab Previewing," Apr. 6, 2007, http://replay.web.archive.org/20070406181334/http://showcase.uworks.net/tabpreviewing.html.*
Morgenstern, "Transparency returns with a vengeance in Mac OS X Leopard," ZDNet, Oct. 31, 2007, http://www.zdnet.com/blog/apple/transparency-returns-with-a-vengeance-in-mac-os-x-leopard/994.*
Scwizzo, "Adding to a tab window," Jul. 15, 2008, http://cboard.cprogramming.com/windows-programming/105210-adding-tab-window.html.*
Bodnar, "Advanced Windows Controls", Jul. 26, 2007, http://www.zetcode.com/gui/winapi/advancedcontrols/.*

(Continued)

*Primary Examiner* — Matt Kim
*Assistant Examiner* — Ryan Barrett
(74) *Attorney, Agent, or Firm* — Sung Kim; Andrew Sanders; Micky Minhas

(57) ABSTRACT

Tabs or other display elements that do not comply with traditional "window" requirements can be individually presented to a user when the window containing such tabs or other display elements is hidden or obscured. The user can be enabled to perform tab-specific actions, such as closing a particular tab, or viewing a specific tab without interacting with the containing window. Executing processes utilizing such tabs can register them and provide order and display information. Subsequent tab-specific actions can be received and directed to such executing processes. Additional requests, such as for thumbnails and bitmaps, can be directed to such executing processes in order to implement the tab presentation mechanisms and to provide for the tab-specific actions.

20 Claims, 8 Drawing Sheets

(56) References Cited

U.S. PATENT DOCUMENTS

| | | | |
|---|---|---|---|
| 2006/0123353 A1* | 6/2006 | Matthews et al. | 715/779 |
| 2006/0161847 A1* | 7/2006 | Holecek et al. | 715/716 |
| 2006/0224951 A1 | 10/2006 | Burke et al. | |
| 2006/0224989 A1* | 10/2006 | Pettiross et al. | 715/779 |
| 2006/0224997 A1* | 10/2006 | Wong et al. | 715/838 |
| 2006/0230356 A1* | 10/2006 | Sauve et al. | 715/777 |
| 2006/0242602 A1* | 10/2006 | Schechter et al. | 715/838 |
| 2007/0067733 A1 | 3/2007 | Moore et al. | |
| 2007/0180381 A1* | 8/2007 | Rice et al. | 715/711 |
| 2007/0186176 A1 | 8/2007 | Godley | |
| 2008/0016456 A1 | 1/2008 | Friedland et al. | |
| 2008/0082937 A1 | 4/2008 | Bennah et al. | |
| 2008/0109753 A1 | 5/2008 | Karstens | |
| 2008/0307351 A1* | 12/2008 | Louch et al. | 715/782 |
| 2009/0006981 A1* | 1/2009 | Pagan | 715/752 |
| 2009/0193364 A1* | 7/2009 | Jarrett et al. | 715/838 |
| 2010/0107123 A1* | 4/2010 | Sareen et al. | 715/835 |

OTHER PUBLICATIONS

Chand, "Working with Windows TabControl with C#", Dec. 16, 2003, http://www.c-sharpcorner.com/UploadFile/mahesh/TabControlTutorial11302005235835PM/TabControlTutorial.aspx.*

Smith, et al. "GroupBar: The TaskBar Evolved", Retrieved at <<http://research.microsoft.com/cue/publications/OZCHI2003-GroupBar.pdf, pp. 1-10.

"How to Manage Tabs in Mozilla Firefox", Retrieved at <<http://www.ehow.com/how_2146806_manage-tabs-mozilla-firefox.html, Aug. 27, 2008, pp. 1-3.

Jhaveri, et al "The Advantages of a Cross-Session Web Workspace", Retrieved at <<http://www.cs.uta.fi/~nj73504/jhaveri_ch105.pdf, CHI 2005, Apr. 2-7, 2004, Portland, Oregon, USA, ACM, pp. 4.

"International Search Report", Mailed May 17, 2010, Application No. PCT/US2009/062260, Filed Date Oct. 27, 2009, pp. 1-11.

"Supplementary European Search Report", Mailed Feb. 13, 2013, Application No. EP 09289604; pp. 1-5.

* cited by examiner

CHILD WINDOW SURFACING AND MANAGEMENT

BACKGROUND

The most popular user-interface paradigm in modern personal computing devices is the "desktop" paradigm, where information associated with work the user is performing on the computing device is centrally displayed, such as within one or more windows, and additional information relevant either to that work, or to the overall status of the computing device and the computer-executable instructions executing on the computing device is peripherally displayed. Such a "desktop" paradigm is meant to mirror a typical physical work desk, where documents associated with the work currently being performed are typically placed within the center of the desk, and the periphery of the desk comprises other tools or documents that may be referenced, though less frequently.

Information typically presented to a user within the periphery of a computing device's display can include notifications, such as the current time, the status of various aspects of the computing device, such as whether it is connected to a network or the current charge capacity of the computing device's battery, and notifications relevant to processes executing on the computing device, such as a notification that new hardware was detected, a malware scan is being performed, or other like notifications. Information typically presented to a user within the periphery of a computing device's display can also include indications of tasks, either that the user has already initiated, or that the user often uses. For example, such tasks can include visual representations of one or more processes or application programs that the user has already executed, or visual representations of one or more processes or application programs that the user often executes.

Many users of modern computing devices have multiple application programs and other processes executing simultaneously. Within each of these application programs or processes, furthermore, users may have caused the presentation of multiple individual windows or similar visual information containers, thereby potentially overcrowding the user interface being presented by the computing device. One mechanism that is utilized to address such overcrowding, especially by multiple windows that are all associated with a single process, such as an application program, is a tab-based user interface whereby, rather than presenting information to a user through multiple windows, a single window is utilized and the information within the window is controlled through the selection of "tabs". More specifically, much like tabs in a notebook provide for easy access to tabbed information, the tabs in a tab-based interface enable a user to efficiently access content. Such content, which may have traditionally been displayed in a separate window, can now be hidden "behind" active content within one window, and can be efficiently accessed via a presented tab-based interface. However, because such a tab-based interface is presented within a single window, window-based organizational mechanisms do not apply to individual tabs, and instead apply to the overall window that contains all of the tabs. As a result, if a user wishes to interact with tabs or tabbed content, they must bring the process or application program providing such tabs and tabbed content to the forefront of the user interface being presented by the computing device.

SUMMARY

Representations of tasks, such as icons of application programs that are already executing, can comprise one or more smaller visual presentations of each window or other display sub-element currently maintained by the application program or other task. Such smaller visual presentations, or "thumbnails" can be displayed when a user indicates a desire to interact with the application program, such as by moving the cursor over the icon or other representation of the application program. To maintain an uncluttered "desktop" motif, however, such thumbnails can remain hidden while the user is performing other tasks, or is otherwise not indicating a desire to interact with the associated application program.

In one embodiment, to present, to a user, information contained in individual tabs of an application program or other process, and to enable the user to interact with those individual tabs, thumbnails of the individual tabs being presented by the application program or other process can be provided to the user when the user acts upon the icon or other task reference of the application program or other process. Consequently, a user interface that can provide thumbnails of windows, such as, for example, to enable a user to easily evaluate hidden content, can likewise provide thumbnails of tabs of hidden windows as if each tab were an individual window.

In another embodiment, displayed thumbnails of tabs can provide for user interactivity analogous to that provided by displayed thumbnails of windows. For example, displayed thumbnails of tabs can provide for an interface by which individual tabs can be closed without bringing the window comprising such tabs to the forefront. Alternatively, the selection of a particular thumbnail of a tab can result in the bringing, to the forefront, the window comprising such a tab, with the selected tab displayed, irrespective of which tab may have been displayed when the window was hidden.

In a further embodiment, user action towards a displayed thumbnail of a tab can result in a temporary display of the thumbnail in a manner analogous to a temporary display of a window in response to user action towards a displayed thumbnail of the window. Mechanisms providing for the display of thumbnails of a tab can interpret appropriate user action and can request the application program, or other process, controlling a selected tab to provide access to a bitmap of the tab's display. Such a bitmap can then be presented to the user in an appropriate manner, such as by displaying other content in a transparent manner. Such a display can be temporary, and can be terminated when the user ceases an appropriate action directed towards the thumbnail of the tab.

In a still further embodiment, application programs or other processes can provide, such as to an operating system or other utility providing the above-indicated functionality, a specification of the tabs or other interface elements that such application programs or other processes wish to have individually represented. The information provided can comprise the registering and deregistering of tabs, or other interface elements, as well as indications of which of them is currently active and what their order is, as maintained by the application program or other process. The application program or other process can likewise respond to requests from the operating system or other utility providing the above-indicated functionality, such as requests for a current bitmap of the content of a tab, or a request to close a tab or move a tab into a foremost, displayed position.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
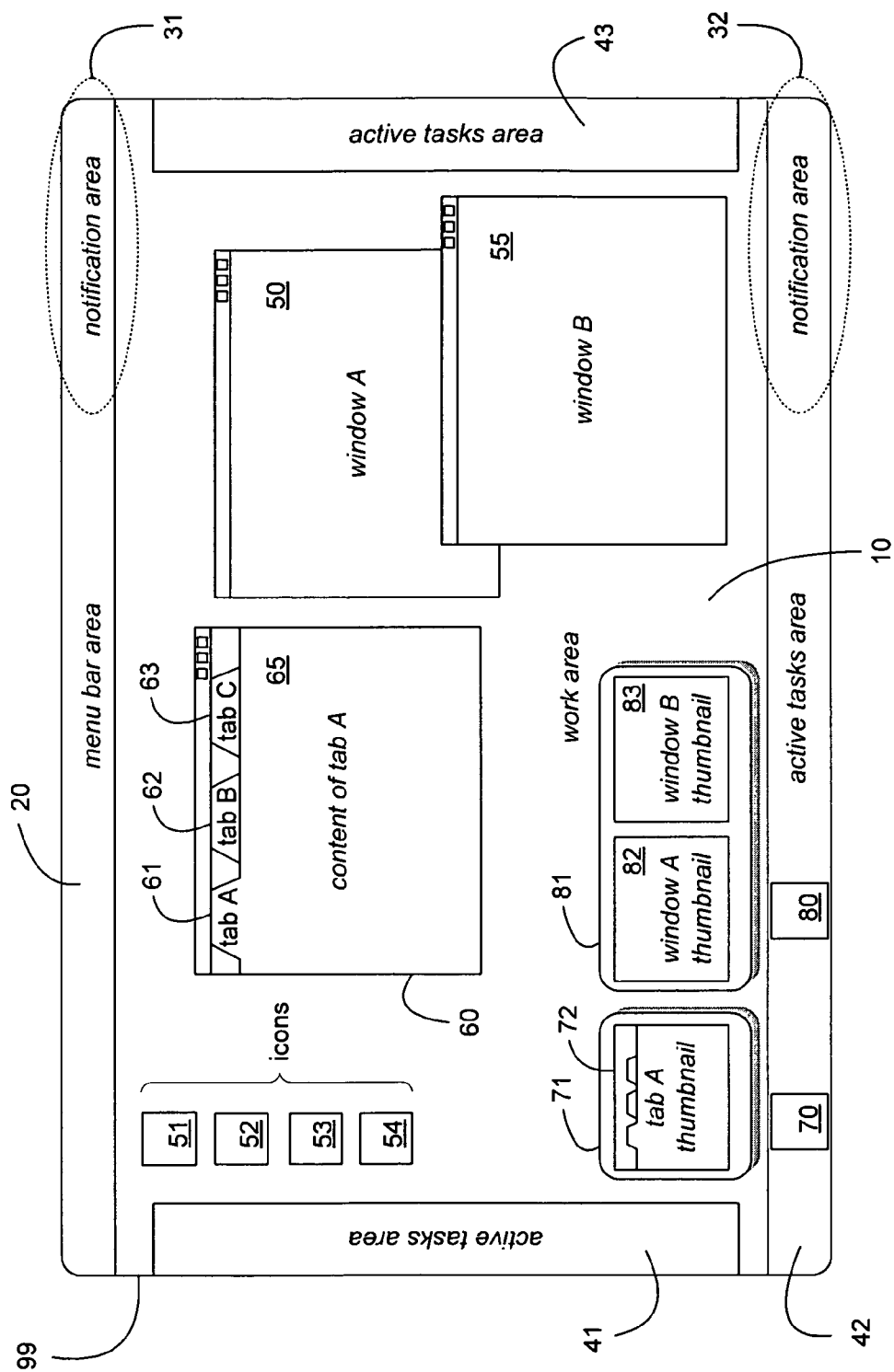
FIG. 1 is a diagram of an exemplary desktop-paradigm display interface that provides context for the described functionality.

The following description relates to the presentation, to a user of a computing device, of thumbnails of tabs or other user interface elements that do not qualify as standard, "top-level" windows, thereby enabling the user to perform functions directed to those tabs or other user interface elements in a manner equivalent to that with which the user performed such functions with standard, "top-level" windows. Application programs, or other processes, can register tabs, or any other user interface elements that they wish to be individually addressable by the user through mechanisms, including thumbnail-based mechanisms, that can be provided by an operating system or other utility. Such a registration can include appropriate registrations and deregistrations of tabs or other user interface elements as they are created and removed by the application program or other process, as well as an indication of which tabs, or other user interface elements are displayed, and the order of the tabs or other user interface elements.

The techniques described herein focus on the presentation of thumbnails of tabs, and associated tab-specific controls, within the context of a window-based computing device interface, such as an interface conforming to the "desktop" paradigm. However, while, for ease of reference, the below descriptions will be made with reference to tabs within a window, the techniques described herein are not so limited. For example, the techniques described can be equally applied to any type of interface, and do not require any inherent aspect of the "desktop" paradigm. Similarly, the techniques described can be equally applied to any user interface element, such as a toolbar, palette, control pod and the like, and do not require any feature or functionality inherent only in tabs. In addition, while the descriptions below make reference to the operating system, the techniques described can be implemented by any computer-executable instructions capable of performing the mechanisms described, and do not rely upon any functionality offered only by operating systems. Consequently, the following descriptions are meant to be illustrative of any mechanisms by which the below-described techniques can be implemented.

Although not required, the description below will be in the general context of instructions being executed by a device having computational abilities. Such "computing devices" include both traditional computers and consumer-electronic devices having computational abilities, such as those provided by a central processing unit. Thus, the description below will be in the general context of "computer-executable instructions," such as program modules, that are capable of being executed by such a "computing device." More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers and conventional personal electronics devices, and can include other devices capable of computation, including hand-held devices, multi-processor systems, other microprocessor based or programmable consumer electronics, network PCs, minicomputers, mainframe computers, and the like. Similarly, the computing devices need not be limited to a stand-alone device, as the mechanisms may also be practiced in distributed computing environments where tasks are performed by remote processing devices that are linked through a communications network. In a distributed computing environment, program modules may be located in both local and remote memory storage devices.

With reference to FIG. 1, an exemplary display 99 is illustrated, providing context for the descriptions below. The exemplary display 99 illustrates a typical "desktop" computing device interface paradigm, with a central work area 10 that can comprise display sub-elements, such as windows 50, 55 and 60, icons, such as icons 51, 52, 53 and 54 and other representations that can be directed to the one or more activities that a user may currently be performing on the computing device. As will be known by those skilled in the art, and as utilized herein, the term "window" is meant to refer to a display sub-element that can be independently controlled, that can provide a bounded region within which information can be displayed to the user, and that conforms to, and complies with, the requirements of a "window" as expressed by a relevant window-based operating system or other utility.

In addition to the work area 10 and elements contained within it, the exemplary display 99 can further comprise a menu bar area 20 at the top of the display for providing access to menus or similar user interface elements. Often, as shown in FIG. 1, the menu bar area 20 can further include a notification area 31 for providing notifications or status indicators, such as a current time, a network connectivity indicator, a battery indicator and the like. The exemplary display 99 can also comprise one or more areas around the periphery of the display that can be utilized to provide the user with simplified access to computer-executable instructions, such as application programs, that can be already executing, or which are commonly used by the user, with additional indications for those that are already executing. The exemplary display 99 illustrates three such areas, namely the active tasks areas 41, 42 and 43. Traditionally, only one active task area is utilized, and, in some instances, the user is allowed to select which of the active tasks areas 41, 42 and 43 will be utilized. However, the descriptions below are equally applicable if more than one active tasks area is simultaneously utilized.

Traditionally, an active tasks area, such as active tasks areas 41, 42 and 43 can comprise icons or other indicators of the application programs that are currently executing or are otherwise often utilized by the user. The exemplary display 99 comprises two such task indicators, namely icons 70 and 80. Such task indicators can vary in size, but are often fairly small to enable multiple such indicators to exist within the active tasks area without impinging on the work area 10. In addition, the active tasks areas, such as active task area 42, can also comprise notification areas, such as notification area 32, that can comprise alerts or notifications similar to those described above with reference to the notification area 31.

For illustrative purposes, the work area 10 of the exemplary display 99 is illustrated as comprising three visible windows, namely windows 50, 55 and 60. With some operating systems or other utilities, windows 50, 55 and 60 can be individually hidden, such that the application program or other process with which such windows are associated can remain executing, but the visual presentation of such an application program or other process, such as through windows 50, 55, or 60, can be temporarily suspended, thereby providing more room within the work area 10 for other windows or visual displays that the user wishes to focus on at that time. One mechanism by which a user can recall windows 50, 55, or 60, such that they are no longer hidden, but are instead displayed within the work area 10, is via a task reference, such as icons 70 and 80. In the illustrated exemplary display 99, windows 50 and 55 can be associated with an application program associated with the icon 80, while window 60 can be associated with an application program associated with the icon 70. In such a case, if a user hid windows 50 and 55, the user could re-display those windows via the icon 80. Similarly, if the user had hidden window 60, the user could re-display that window via the icon 70.

Some operating systems, or other utilities, provide for the presentation of thumbnails to enable a user to more accurately gauge the content of a window before re-displaying that window, or before switching the focus of the work area 10 such that the selected window is foremost. For example, in the illustrated exemplary display 99, an appropriate user action on the icons 70 and 80 can initiate the display of floating display elements 71 and 81, comprising thumbnails 72 and 82 and 83, respectively. The thumbnail 72 can comprise a miniaturized version of the window 60, while the thumbnail 82 can comprise a miniaturized version of the window 50 and the thumbnail 83 can comprise a miniaturized version of the window 55. Traditionally, the floating display elements 71 and 81 would not be presented simultaneously, as they are shown in display 99, but, for ease of reference and description, they are shown as such.

An application program or other process can utilize a tab-based structure to display additional information within its window. Thus, for example, while the application program or other process associated with the windows 50 and 55 is utilizing two windows in the exemplary display 99, the application program or other process associated with the window 60 is utilizing only a single window, but has provided for the user multiple tabs, namely tabs 61, 62 and 63, with which the user can switch among displayed content, much as the user could by switching between windows 50 and 55. However, as can be seen, the thumbnail 72 corresponding to window 60 can display the window 60 itself, and not any of the individual tabs 61, 62, or 63. Consequently, if the window 60 were hidden or obscured within the work area 10, a user could not see what content was being presented in each of the tabs 62, or 63 via the thumbnail 72 presented within the floating display element 71, which can be shown when the user acts upon icon 70, since such tabs are "hidden behind" the displayed tab 61, both in the window 60 and in the thumbnail 72. By contrast, a user could see the content being presented in each of the windows 50 and 55 via the thumbnails 82 and 83 presented within the floating display element 81, which can be shown when the user acts upon icon 80. An additional drawback is that the user cannot direct actions to any of the individual tabs 61, 62, or 63 via the thumbnail 72 in the same manner that the user could direct actions to the individual windows 50 and 55 via the thumbnails 82 and 83, respectively.

Figure 2:
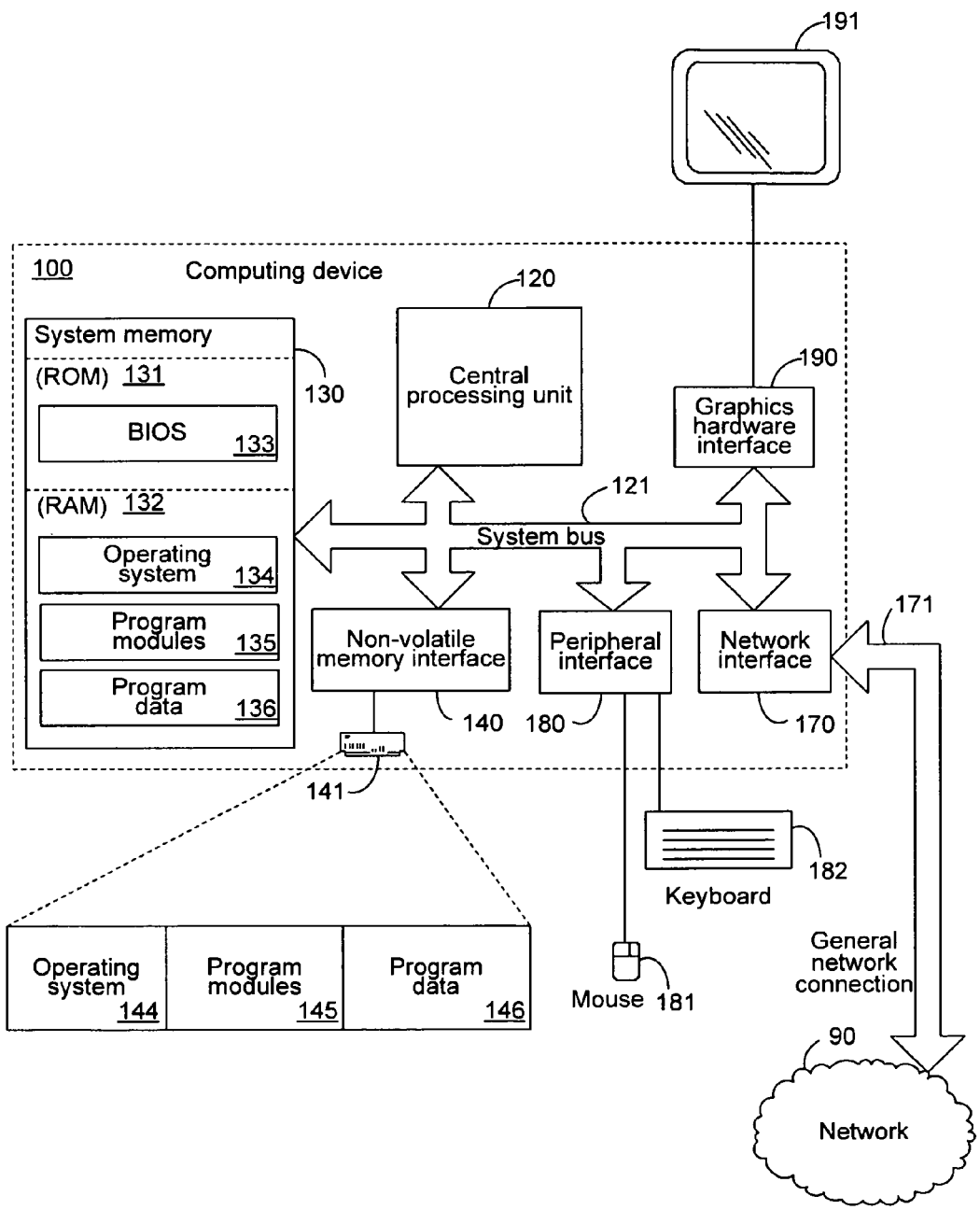
FIG. 2 is a block diagram of an exemplary computing device.

Before proceeding with further descriptions within the context of a computing device display, such as the exemplary display 99, a brief description of an exemplary computing device for generating such a display is provided. Turning to FIG. 2, an exemplary computing device 100 is illustrated, which can include, but is not limited to, one or more central processing units (CPUs) 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. The computing device 100 can include graphics hardware, including, but not limited to, a graphics hardware interface 190 and a display device 191 that can be utilized to present, to the user, displays, such as, for example, the exemplary display 99 described above. Additionally, the computing device 100 can also include user interface elements, including, but not limited to a mouse 181 and a keyboard 182 that can be utilized by a user to generate input in response to the interface displayed via the display device 191. The user interface elements can be communicationally coupled to the system bus 121 via a peripheral interface 180.

The computing device 100 also typically includes computer readable media, which can include any available media that can be accessed by computing device 100 and includes both volatile and nonvolatile media and removable and non-removable media. By way of example, and not limitation, computer readable media may comprise computer storage media, communication media or combinations thereof. Computer storage media includes media implemented in any method or technology for storage of information such as computer readable instructions, data structures, program modules or other data. Communication media typically embodies computer readable instructions, data structures, program modules or other data in a modulated data signal such as a carrier wave or other transport mechanism and includes any information delivery media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computing device 100, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, other program modules 135, and program data 136.

The computing device 100 may also include other removable/non-removable, volatile/nonvolatile computer storage media. By way of example only, FIG. 2 illustrates a hard disk drive 141 that reads from or writes to nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 141 is typically connected to the system bus 121 through an interface such as non-volatile memory interface 140.

The drives and their associated computer storage media discussed above and illustrated in FIG. 2, provide storage of computer readable instructions, data structures, program modules and other data for the computing device 100. In FIG. 2, for example, hard disk drive 141 is illustrated as storing operating system 144, other program modules 145, and program data 146. Note that these components can either be the same as or different from operating system 134, other program modules 135 and program data 136. Operating system 144, other program modules 145 and program data 146 are given different numbers hereto illustrate that, at a minimum, they are different copies.

The computing device 100 may operate in a networked environment using logical connections to one or more remote computers. For simplicity of illustration, and in conformance with the exemplary system 99 of FIG. 1, the computing device 100 is shown in FIG. 2 to be connected to the network 90. The computing device 100 is not limited to any particular network or networking protocols. The network connection depicted in FIGS. 1 and 2 is a general network connection 171 that can be a local area network (LAN), a wide area network (WAN) or other networks. The computing device 100 is connected to the general network connection 171 through a network interface or adapter 170 which is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 171. It will be appreciated that the network connections shown are exemplary and other means of establishing a communications link between computing devices may be used.

Turning back to FIG. 1, as indicated previously, the traditionally provided thumbnail 72 does not provide for any tab-specific information, nor does it enable a user to direct actions individually to one of the tabs 61, 62 and 63. To enable tabs, or any other user interface elements presented by an application program or other process, to be treated as traditional windows, such as windows 50 and 55, within the context of the functionality offered via active task areas, such as active tasks areas 41, 42, or 43, an application program or other process utilizing such tabs or other user interface elements can provide relevant information to an operating system or other utility providing the functionality offered via the active task areas. Before detailing exemplary embodiments of such relevant information, the description below first proceeds with descriptions of exemplary presented user interfaces illustrating the utilization of tab-specific functionality that can be provided given such information.

Figure 3:
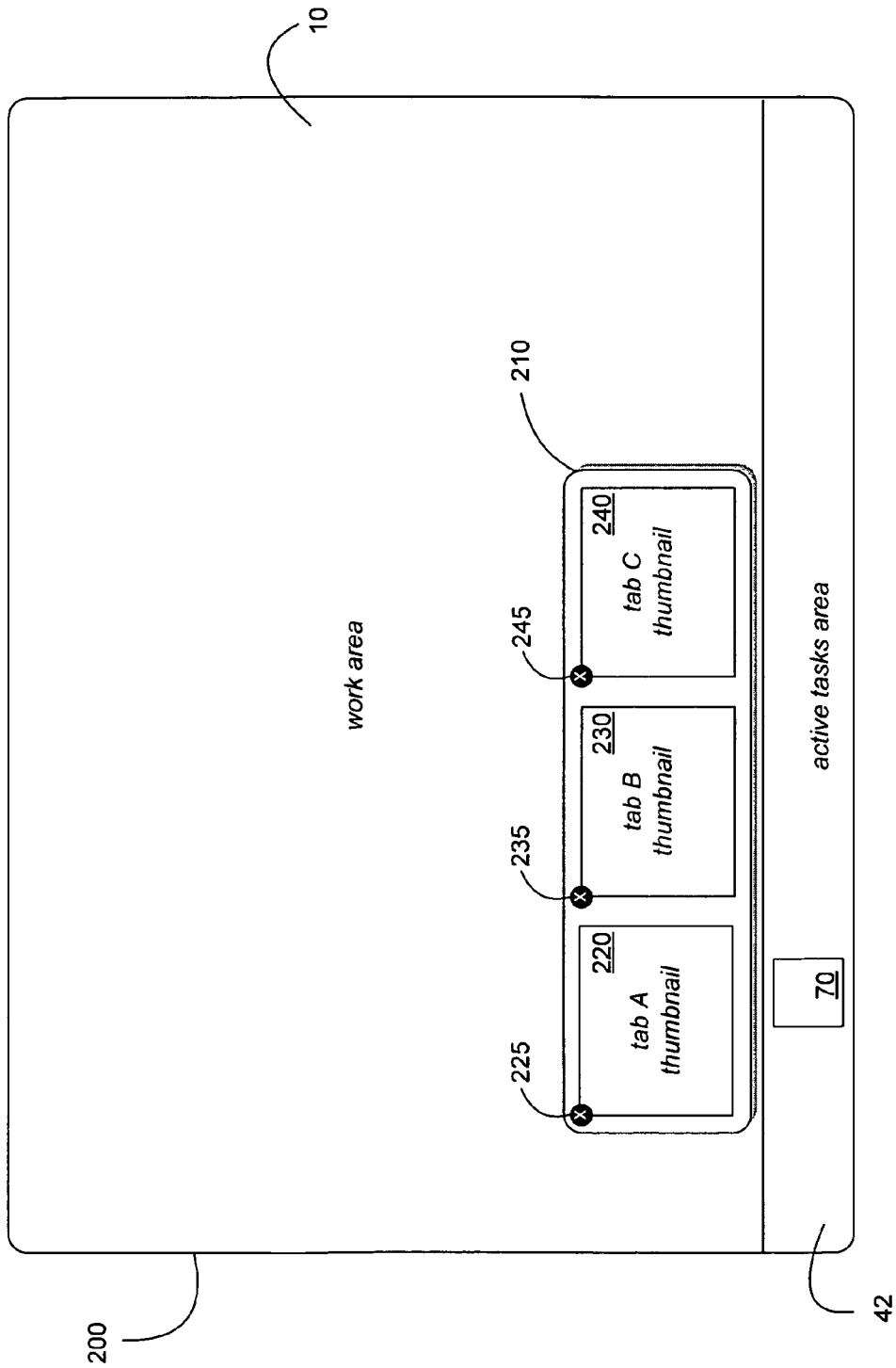
FIG. 3 is a diagram of an exemplary display showing thumbnails of tabs with tab-specific controls.

Turning to FIG. 3, an exemplary display 200 is shown illustrating one embodiment of presenting thumbnails of tabs to a user through a thumbnail presentation interface. As indicated previously, in one embodiment, user action directed towards a task reference, such as the icon 70 in the active tasks area 42, can cause the presentation of thumbnails within a floating display element 210, such as thumbnails 220, 230 and 240 shown in FIG. 3. Consequently, if the one or more windows associated with the application program, or other process, associated with the icon 70 were hidden, or obscured from view, the user could be reminded of what such windows contained by directing an action towards the icon 70, thereby causing the presentation of thumbnails.

In the illustrated embodiment shown in display 200, the presented thumbnails, namely thumbnails 220, 230 and 240, can correspond, not to the window 60 of display 99, which was previously indicated to be associated with the application program associated with the icon 70, but rather to the content of the individual tabs 61, 62 and 63, respectively, that were being displayed in the window 60. Thus, should a user select a particular thumbnail, such as, for example, thumbnail 230 corresponding to tab 62, the window 60 can be returned to the forefront of the work area 10, since, in the exemplary display 200, the window 60 is illustrated as being hidden, and the window 60 can be displayed with the content of tab 62 being presented. Even if the window 60 had been hidden in the form indicated in the exemplary display 99, with the content of the tab 61 being shown, the selection, by a user, of thumbnail 230 can result in the presentation of the window 60 with the content of tab 62 being shown.

Tab-specific actions by a user can also be extended to other functionality, such as a close command. For example, as shown in the exemplary display 200, each of the presented thumbnails 220, 230 and 240 can be presented with individual close functionality, accessible via the close indicators 225, 235 and 245, respectively. If a user were to select one of the close indicators 225, 235, or 245, the corresponding tab could be closed by the application program, or other process, associated with the window 60. Such a tab closure can occur without the window 60 being visible. Thus, for example, if a user were to select the close indicator 245, the tab 63 could be closed while the window 60 remained hidden, as shown in the exemplary display 200. Subsequently, if the window 60 were to be returned to the work area 10, the window 60 could comprise only the tabs 61 and 62, and not tab 63. Similarly, the floating display element 210 could be updated after such a close instruction to comprise only the thumbnails 220 and 230.

Figure 4:
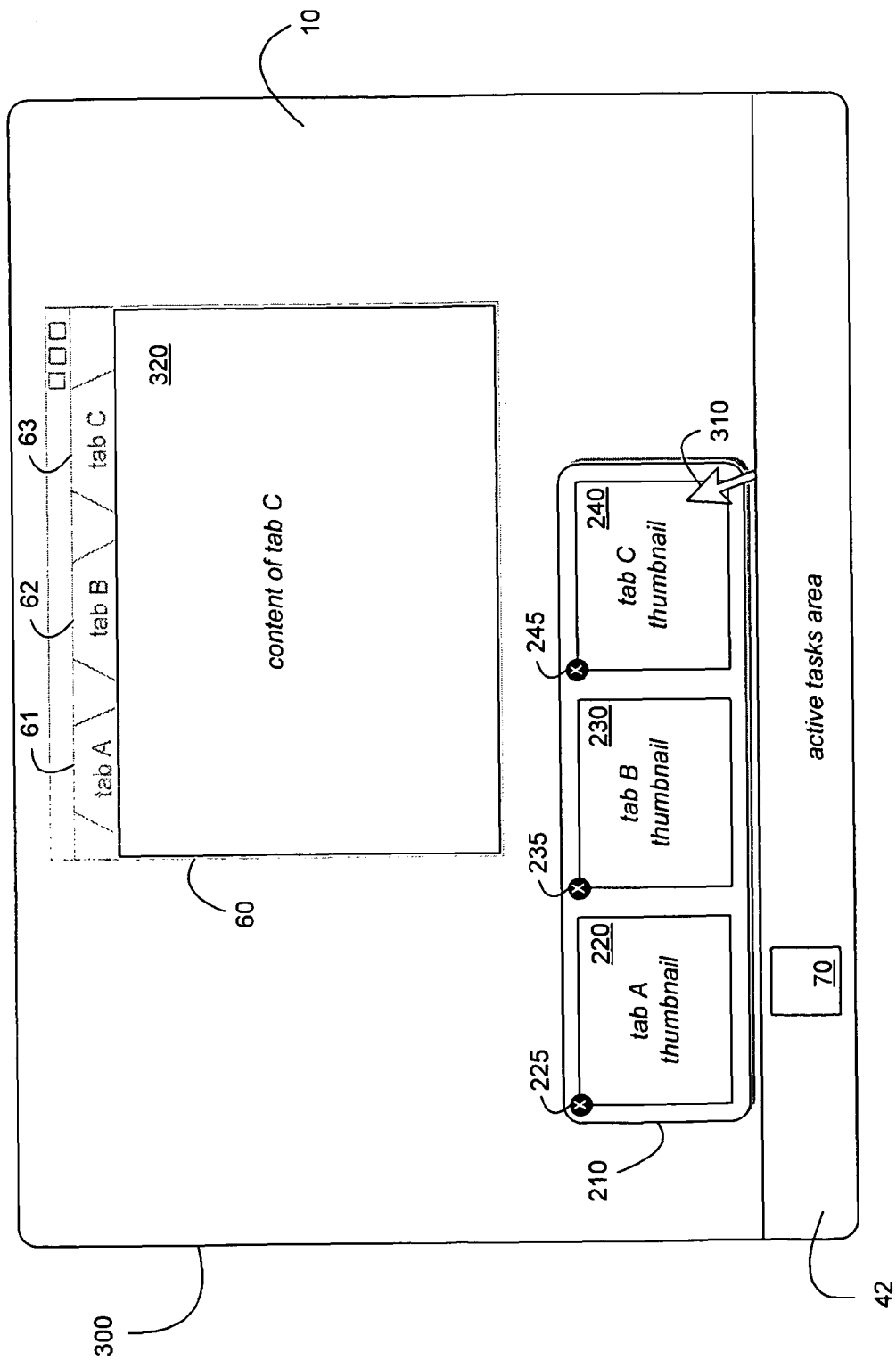
FIG. 4 is a diagram of an exemplary display showing a temporary display of a tab due to action on a thumbnail of a tab.

Additional tab-specific functionality that can be provided to a user through the display of thumbnails of tabs, such as thumbnails 220, 230 and 240, is illustrated with reference to the exemplary display 300 of FIG. 4. Turning to FIG. 4, a cursor 310 is illustrated in the exemplary display 300 as hovering over the thumbnail 240. Such a hover action, if performed for a sufficient duration, can be interpreted as a user action on the thumbnail 240 that can trigger a "peek" feature. As used herein, the term "peek feature" or "peek functionality" references any functionality that can provide for a full-sized preview of the relevant display element without performing a traditional bring-to-the-forefront function typically required to show the display element. Similarly, while the exemplary display 300 illustrates a hover action by the cursor 310 as being an appropriate user action directed to the thumbnail 240, other user actions directed to the thumbnails 240, such as single clicks, double clicks, specific cursor motions, selection of appropriate contextual menu items, and the like, can also be defined and interpreted as an appropriate user action directed to the thumbnail 240 that can trigger peek functionality.

As shown in the exemplary display 300, in one embodiment, the selection of a peek feature with respect to a thumbnail of a tab, such as the thumbnail 240, corresponding to the tab 63 of the window 60, can cause the content of the tab, in the illustrated example, content 320 of tab 63, to be displayed, while other elements, such as the other elements of the window 60, and potentially other existing windows themselves, to be drawn in such a manner that the user does not focus on them and can, instead, focus on the content 320. For example, the other elements of the window 60, and any other existing windows, though not shown in the exemplary display 300 for illustrative convenience, can be displayed as "glass sheets", whereby the edges and potentially other content of such windows or window elements remain somewhat visible, though the window and window elements, as a whole, appear transparent.

Should the user remove the cursor 310, or otherwise cease to act on the thumbnail 240, the content 320 can be removed from the display 300, and the work area 10 can be returned to its prior state. Such temporary tab-specific actions, as opposed to, for example, the close functionality described previously, can equally be made available via the floating display element 210.

Figure 5:
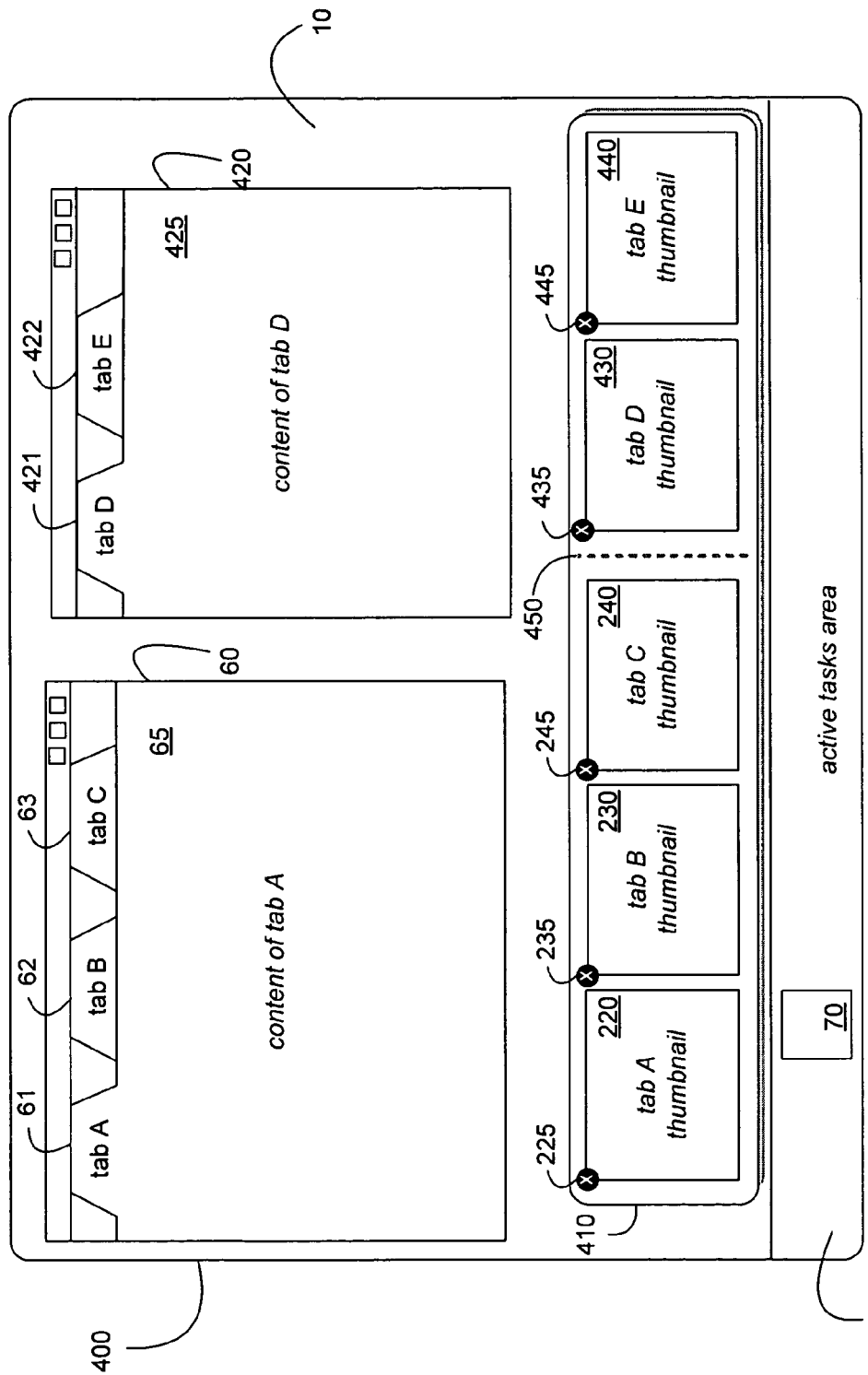
FIG. 5 is a diagram of an exemplary display showing multiple tab-based windows and an associated presentation of thumbnails of those tabs.

In one embodiment, an application program or other process may have multiple windows, such as windows 50 and 55, each with individual tabs, such as the tabs 61, 62 and 63 of window 60. Turning to FIG. 5, an exemplary display 400 illustrates the window 60 of the exemplary display 99 of FIG. 1, in conjunction with another window 420 that can comprise tabs 421 and 422. In the illustrated example of FIG. 5, the window 60 and the window 420 can be presented by the same application program, namely the application program associated with the icon 70. If the window 420 is associated with the same application program, or other process, as window 60, then the floating display element 210 can be modified to accommodate multiple levels of thumbnails. In one embodiment, illustrated by the exemplary display 400, the floating display element 210 can become the floating display element 410 comprising, in an appropriate order, not only the thumbnails 220, 230 and 240, corresponding to the tabs 61, 62 and 63 of the window 60, but also thumbnails 430 and 440, corresponding to the tabs 421 and 422 of window 420. The thumbnails 220, 230 and 240, corresponding to the tabs of the window 60 can be visually separated from the thumbnails 430 and 440, corresponding to the tabs of the window 420, such as by the demarcation indicator 450. The functionality described previously with reference to the thumbnails 220, 230 and 240 can be equally applicable to the thumbnails 430 and 440, even though they are presented by a different window from window 60, namely window 420.

In another embodiment, multiple icons, such as icon 70, could be presented in the active tasks area 42, where the multiple icons still corresponded to a single application program or other process. In such a case, one icon could be associated with one window of the application program, such as window 60, while another icon could be associated with another window of the same application program, such as window 420. A user action directed towards the first icon, the one associated with window 60, could then result in the presentation of a floating display element, such as the floating display element 210, that can comprise thumbnails associated with the tabs 61, 62 and 63 of the window 60, such as thumbnails 220, 230 and 240. An equivalent user action directed towards the second icon, the one associated with window 420, can instead result in the presentation of a floating display element that can comprise thumbnails associated with tabs 421 and 422 of the window 420, such as thumbnails 430 and 440. In such a manner the hierarchical relationship between the windows and their associated tabs, such as window 60 and its associated tabs 61, 62 and 63, and window 420, and its associated tabs 421 and 422, can be maintained.

In a further embodiment, rather than presenting all of the thumbnails 220, 230, 240, 430 and 440 within a single floating display element 410, the floating display element 410 could, instead, provide a thumbnail of only the window 60 and the window 420. Each such thumbnail could then, in turn, provide access to a further floating display element that could provide access to the thumbnails 220, 230, 240, 430 and 440. Specifically, the thumbnail of the window 60 could provide access to a floating display element that could comprise the thumbnails 220, 230 and 240, while the thumbnail of the window 410 could provide access to a floating display element that could comprise the thumbnails 430 and 440. In one embodiment, such additional floating display elements could be presented together with the floating display elements comprising the thumbnails of the windows 60 and 420, while, in another embodiment, such additional floating display elements could be presented only in response to appropriate user action directed towards one of the thumbnails of the window 60 or the window 420.

To provide for the above-illustrated functionality, among other like functionality, an application program or other process can provide information regarding its tabs, or any other display elements that it seeks to have presented and utilized independently in the above-described manner. Such information can, in one embodiment, comprise registration information indicating the creation of the tab or other display element by the application program or other process. Conversely, if the tab or other display element is closed or otherwise terminated by the application program or other process, it can be unregistered by the application program or other process. Additional provided information can further comprise ordering information of the tabs or other display elements, and information regarding which tab or display element is visible. For example, in the illustrated exemplary display 400 of FIG. 5, the application program associated with windows 60 and 420 could have registered each of the tabs 61, 62, 63, 421 and 422, indicating that the order of the tabs within window 60, for example, was first tab 61, then tab 62, and finally tab 63, and also indicating that the order of the tabs within window 420, for example, was first tab 421, followed by tab 422. The application program associated with windows 60 and 420 can further have indicated that tab 61 was visible to a user within the window 60 and that tab 421 was visible within window 420. As will be known by those skilled in the art, tabs can be structured such that only one tab is visible within a window at a time. For example, within the exemplary display 400, only the content 65 of tab 61 is visible within the window 60, and the content of tabs 62 and 63 is not presented. However, other display elements may not be so limited. Consequently, it is intended that multiple display elements can be indicated, by the application program or other process, as being visible.

Figure 6:
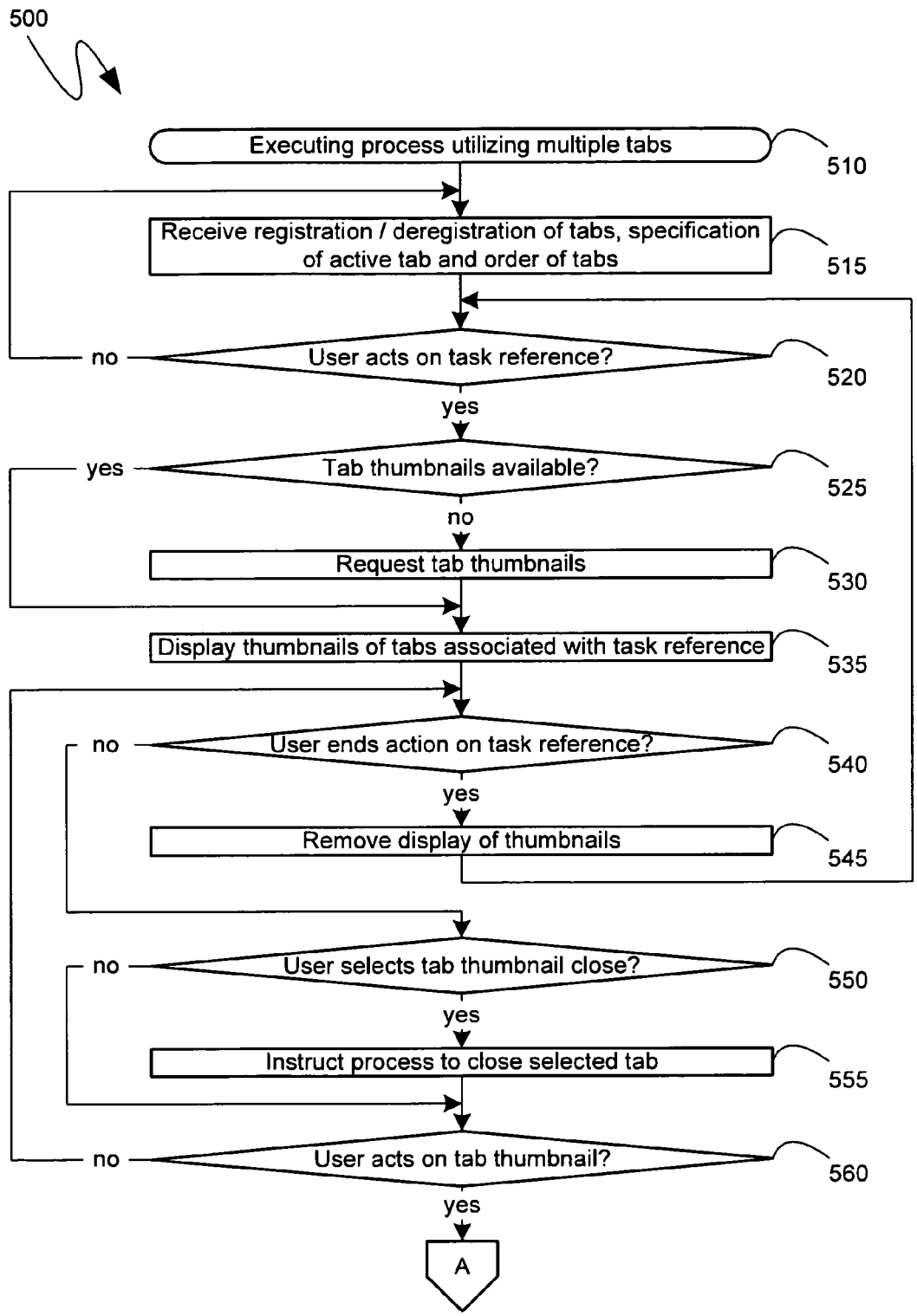
FIG. 6 is an initial portion of a flow diagram of an exemplary process for displaying and utilizing thumbnails of tabs.

Turning to FIG. 6, an exemplary flow diagram 500 is shown, illustrating an exemplary series of steps for implementing the above described mechanisms. As indicated previously, while the descriptions herein focus on tab-based interfaces, other display elements in addition to tabs can be equally compatible with the described mechanisms. For ease of reference and illustration, however, the descriptions of the flow diagram 500 will refer to tabs; while such descriptions are intended to broadly encompass other display elements as well.

Initially, as shown, at step 510, an executing process, such as an application program, can utilize multiple tabs. If the executing process desires to take advantage of the above described mechanisms, it can provide information regarding its tabs and such information can be received at step 515. More specifically, step 515 can encompass the receipt of registration of one or more tabs, indications of the order of the one or more tabs, and indications of which of the one or more tabs are displayed. Step 515 can further encompass changes to a previously indicated order or displayed tab, such as through the receipt of a new ordering a new indication of a displayed tab. Step 515 can also encompass unregistering previously registered tabs, such as when such tabs are closed by a user or other action of the executing process.

As will be known by those skilled in the art, the executing process of the initiating step 510 can have corresponding to it a task reference, such as icon 70, within an active tasks area, such as active tasks area 42. If, at step 520, it is determined that a user acts upon that task reference, thumbnails of the tabs associated with the task reference can, ultimately, be displayed at step 535. More specifically, the user's action, at step 520, can be any user action that can be pre-defined to indicate an intent to display information about the executing process associated with the task reference to which the user's action is directed. Thus, for example, the user's action at step 520 can be a hovering of a cursor over the task reference, a click on the task reference, a contextual menu selection associated with the task reference, or any other such action.

Before displaying thumbnails of tab, as well as any thumbnails of other open windows associated with the task reference to which the user's action of step 520 was directed, a determination can be made, at step 525, as to whether there are any thumbnails available for the tabs registered at step 515. In one embodiment, if there are no such thumbnails, then, at step 530, such thumbnails can be requested, such as from the executing process associated with such tabs. In another embodiment, not specifically illustrated in flow diagram 500, if it is determined at step 525, that thumbnails of registered tabs do not already exist, then the process responsible for displaying such thumbnails, such as the operating system, or another utility, can generate the thumbnails itself. Such self-generation of thumbnails can be accomplished by obtaining a bitmap of the registered tabs' content, by providing appropriate handles to the registered tabs' content, or through other like means.

Once the thumbnails of the tabs registered at step 515 are available, they can be displayed at step 535 in response to the user's action, detected at step 520. In one embodiment, the displayed thumbnails can be sized appropriately, such that all, or mostly all, of the thumbnails fit within the limits of the display on which they are being shown. In such an embodiment, the requested thumbnails at step 530 can be of a specific size, or of a minimum size, and subsequent resizing, such as to fit the thumbnails within the display, can be performed by the same mechanisms as are displaying the thumbnails in accordance with known graphic resampling and resizing methodologies. In addition to the thumbnails of registered tabs, the display, at step 535, can further comprise thumbnails of windows associated with the executing process on whose task reference the user acted.

If the user ends their action on the task reference, as determined at step 540, the display of the thumbnails can be removed at step 545, and processing can return to monitoring the user's action on the task reference at step 520. As indicated, if it is determined that the user has not acted on the task reference at step 520, processing can loop back to step 515 and await updated information associated with the tabs being utilized by an executing process. As will be known by those skilled in the art, the monitoring of user action on a task reference at step 520 and 540, and the monitoring of the receipt of tab-specific information at step 515 can be performed in parallel, such as by individually executing threads of computer-executable instructions, and need not occur in the linear and dependent manner illustrated by flow diagram 500. Indeed, the explicit division of such operations into the illustrated steps of the flow diagram 500 was done strictly for descriptive, and illustrative, simplicity, rather than as an explicit indication of a particular programmatic approach.

If, at step 540, it is determined that the user is continuing to act on the task reference, a subsequent determination, at step 550, can determine if the user has selected a close command associated with any one or more of the displayed thumbnails. If the user has selected such a close command, then, at step 555, the executing process associated with the tab to which the close command was directed can be instructed to close the appropriate tab. In one embodiment, the information received at step 515 can provide for the specification of a specific tab to the executing process at step 555, and the executing process can close the indicated tab in a manner equivalent to that utilized if a user had closed such a tab within the context of the user interface presented by the executing process. If the window comprising such a tab was hidden, such a window can, in one embodiment, remain hidden while the executing process closes the indicated tab.

Figure 7:
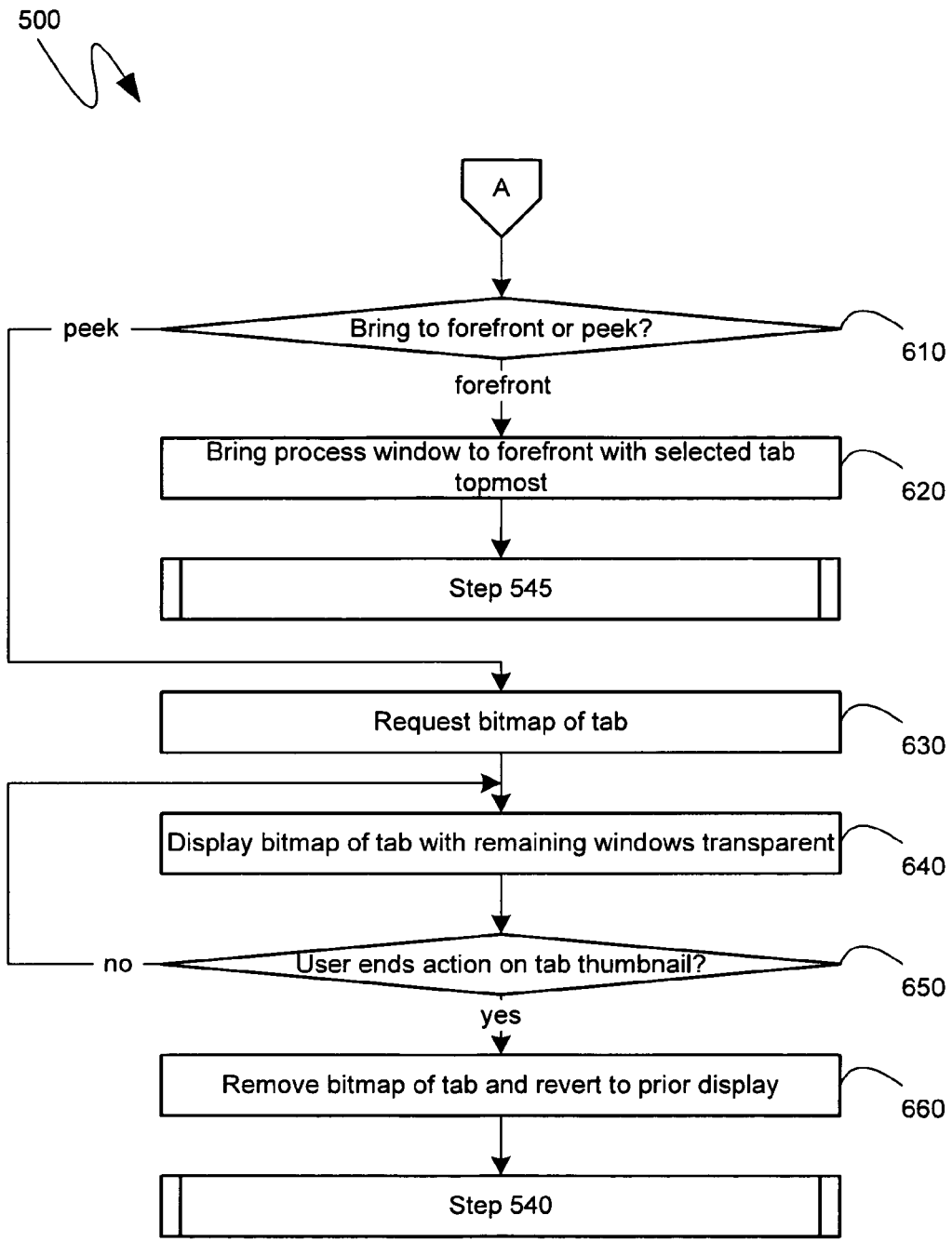
FIG. 7 is a latter portion of the flow diagram of the exemplary process for displaying and utilizing thumbnails of tabs.

If the user had not selected to close a tab at step 550, a further check can be made at step 560 to determine if the user had acted on one of the thumbnails displayed. If the user had not acted on a thumbnail, processing can return to step 540. If, however, the user had acted on a thumbnail, then, proceeding to the remainder of the flow diagram 500, as shown in FIG. 7, at step 610 a determination can be made as to whether the user's action was to bring a hidden or obscured window, comprising the tab, to the forefront, or whether it was to perform a "peek" in the manner described previously. Again, as before, the user's action of step 560 can be any action that can be predefined to indicate the user's intent, such as, for example, a hover to indicate an intention to perform a "peek", or a click to indicate an intention to bring a window to the forefront of the work area 10, or any other similar action, including menu selection, key combinations or combinations of keystrokes and cursor or pointer actions.

If the user's action at step 560 is determined, at step 610, to be a request to bring a window comprising the tab associated with the thumbnail to which the user directed their action, processing can proceed with step 620, whereby the relevant window is brought to the forefront of the work area 10. Additionally, at step 620, the tab associated with the thumbnail to which the user directed their action can be made to be the topmost tab within the window that was brought to the forefront. In one embodiment, step 620 can comprise a communication, to the executing process associated with the window and the tab, that can instruct such an executing process to display the selected tab, irrespective of the currently displayed tab. Processing can then resume with step 545, wherein the display of the thumbnails can be removed, since the window comprising at least some of the thumbnails is now foremost within the work area 10.

If, at step 610, the user's action of step 560 is determined to be a request for a peek feature, a full size bitmap of the content of the tab associated with the thumbnail to which the user directed their action can be requested from the executing process responsible for the display of such content. The bitmap can then be utilized to implement the peek functionality at step 640, such as in the manner illustrated by the exemplary display 300 of FIG. 4. In one embodiment, the received bitmap can be utilized to implement the peek functionality by bringing the window, comprising the tab whose content is being displayed by the peek feature, to the forefront of the work area 10, changing all of the content of the work area 10, including the aforementioned window, into a transparent "glass sheet" version, and then overlaying the bitmap, in a opaque manner, in the appropriate area of the work area 10. The resulting appearance can be that the requested tab's content is being displayed within the window comprising such a tab, even though such a window need not have changed its display, since the bitmap was merely overlaid upon it in an opaque manner.

After implementing the peek feature at step 640, a check can be made, at step 650, to verify that the user is still requesting such functionality. As indicated previously, a peek feature can be temporarily implemented. Consequently, if, at step 650, it is determined that the user has ended the appropriate action directed towards the thumbnail of the tab, then, at step 660, the bitmap can be removed, the window comprising the tab can be rehidden, or returned to the background, and the work area 10 can otherwise be returned to its state prior to the implementation of the peek feature at step 640. Subsequently, processing can return to step 540, described previously. If, however, at step 650, the user is continuing to request the peek feature, then processing can loop back to step 640, and the bitmap of the content of the requested tab can continue to be displayed.

As indicated previously with reference to steps 515, 520 and 540, the checks of steps 550, 560, 610 and 650 are likewise shown in a linear, dependent manner only for ease of description and illustration. Specifically, the checks of the user's actions performed at steps 550, 560, 610 and 650 can be implemented in a parallel manner, such that any user action can, with a single determining step, be interpreted and responded to in the manner described. Additionally, checks 540 and 650, wherein a determination is made whether a user has ceased a prior action, can also be implemented through the singular user action monitoring indicated, whereby the detection of another user action can be interpreted to mean that the user is no longer performing the prior action. Consequently, as indicated previously, the steps of flow diagram 500 are meant to illustrate specific steps relevant to the descriptions above, and are not meant to describe a specific self-contained programmatic implementation.

Figure 8:
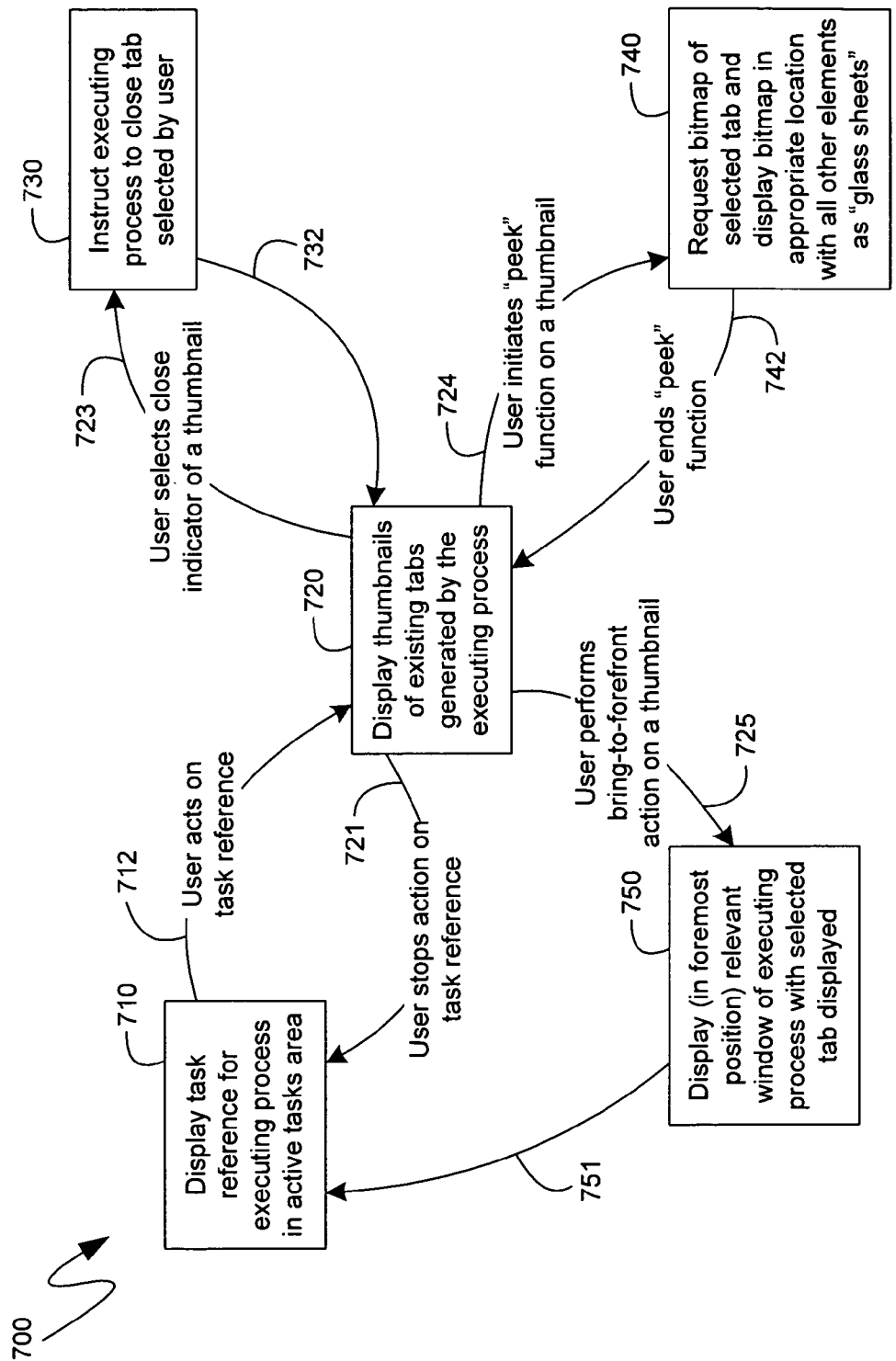
FIG. 8 is a state diagram of an exemplary series of displays.

To provide a more programmatically accurate description of the contemplated mechanisms, the state diagram 700 of FIG. 8 illustrates the various states referenced, above, by the description of the flow diagram 500, and the relevant transitions between such states. Turning to FIG. 8, the state diagram 700 comprises states 710, 720, 730, 740 and 750, representing various displayed interfaces, and further comprises indications of user actions that can transition between the interface states.

Initially, at state 710, a task reference, such as the icon 70, can be displayed, for an executing process, in an active tasks area, such as the active tasks area 42. If a user acts on the task reference, as indicated by the action 712, the display state can change to state 720, in which thumbnails of tabs, or other display sub-elements, generated by the executing process, are shown in response to the user's action 712. As indicated previously, such user action can include any predefined action, such as hovering over, or clicking on, the task reference. If the user no longer performs a relevant action on the task reference, as indicated by transition 721, the display state can revert back to state 710.

From display state 720, if the user selects one of the close indicators, such as close indicators 225, 235 and 245, as indicated by action 723, the executing process can be notified, as indicated by state 730, and, as indicated by action 732, the display state can remain at state 720. Thus, as indicated previously, in one embodiment, the action of closing a tab, for example, in response to a user selecting a displayed close indicator, such as close indicators 225, 235 and 245, can be performed without changing the displayed interface being presented to the user.

If, instead of closing a tab, the user initiated a peek function, as described previously, with respect to one of the displayed thumbnails, as represented by action 724, the displayed state could transition to state 740, whereby, as also indicated previously, a received bitmap of the requested tab can be displayed with the remaining display elements being presented in a transparent, or similarly unobtrusive manner. The request for a peek function represented by action 724 can be, like the user action 712, any action that is predefined to invoke such a feature. In one embodiment, hovering over a displayed thumbnail for a predetermined period of time can result in the initiation of the peek function, as represented by action 724. Once the user ceases the predefined action, such as by no longer hovering over a thumbnail, that action, represented by action 742, can result in the return, from the peek displayed state 740 to the displayed state 720.

If, instead of merely initiating a peek function, the user sought to transition to a tab, or like display element, the user could select the displayed thumbnail of the relevant tab at state 720. Such a selection action 725 can cause the transition from state 720 to the displayed state 750, in which the tab, or other like display element, associated with the thumbnail to which the user directed action 725, can be displayed foremost. More specifically, the window containing such a tab can be displayed foremost in state 750, and the selected tab can be displayed within such a window, in the manner described previously. In one embodiment, the user's action 725 of selecting a tab can end the display of the thumbnails in display state 720 and can, as indicated by action 751, return to the displayed state 710, where the task reference can remain displayed in the active tasks area.

As can be seen from the above descriptions, mechanisms for managing and surfacing tabs and other display elements have been presented. In view of the many possible variations of the subject matter described herein, we claim as our invention all such embodiments as may come within the scope of the following claims and equivalents thereto.

We claim:

1. One or more computer-readable storage media comprising computer-executable instructions for providing individual access to sub-window display elements, the computer-executable instructions directed to steps comprising:

displaying a task reference for an application program that is executing independently of the computer-executable instructions and that utilizes multiple of the sub-window display elements within a single window such that content of only one of the multiple sub-window display elements is visible within the single window while content of others of the multiple sub-windows display elements is not concurrently displayed within the single window, each of the multiple sub-window display elements having content provided by the application program;

receiving, from the independently-executing application program, individual sub-window registration information for at least two of the multiple sub-window display elements;

detecting a first user action directed to the task reference;

requesting, in a single request, from the independently-executing application program, individual thumbnails of the content of the at least two multiple sub-window display elements for which the individual sub-window registration information was received; and displaying a display element proximate to the display of the task reference, the display element comprising the individual thumbnails of the content of the at least two multiple sub-window display elements for which the individual sub-window registration information was received, each of the individual thumbnails being independently user-selectable.

2. The computer-readable storage media of claim 1, comprising further computer-executable instructions directed to: receiving information specifying an order of the at least two multiple sub-window display elements for which the individual sub-window registration information was received.

3. The computer-readable storage media of claim 1, comprising further computer-executable instructions directed to: receiving information specifying which of the at least two multiple sub-window display elements for which the individual sub-window registration information was received is the one of the multiple sub-window display elements whose content is visible within the single window.

4. The computer-readable storage media of claim 1, comprising further computer-executable instructions directed to: displaying close indicators associated with the individual thumbnails; detecting a second user action directed to one of the close indicators; identifying one of the multiple sub-window display elements associated with the one of the close indicators; and instructing the independently-executing application program to close the identified one of the multiple sub-window display elements.

5. The computer-readable storage media of claim 1, wherein the independently-executing application program utilizes multiple additional sub-window display elements within a second single window such that content of only one of the additional multiple sub-window display elements is visible within the second single window while content of others of the additional multiple sub-windows display elements is not concurrently displayed within the second single window, and wherein further the display element further comprises individual thumbnails of content of at least two of the additional sub-window display elements, the computer-readable storage media comprising further computer-executable instructions directed to: receiving additional individual sub-window registration information from the independently-executing application program for the two of the multiple additional sub-windows display elements.

6. The computer-readable storage media of claim 1, wherein the independently-executing application program utilizes multiple additional sub-window display elements within a second single window such that content of only one of the additional multiple sub-window display elements is visible within the second single window while content of others of the additional multiple sub-windows display elements is not concurrently displayed within the second single window, the computer-readable storage media comprising further computer-executable instructions directed to: receiving additional individual sub-window registration information from the independently-executing application program for at least two of the multiple additional sub-windows display elements; displaying, in response to the detecting the first user action, a second display element proximate to the display of the task reference, the second display element comprising thumbnails of content of the single window and content of the second single window; and detecting a second user action directed to the thumbnail of the single window; wherein the displaying the display element is in response to the detection of the second user action.

7. The computer-readable storage media of claim 1, comprising further computer-executable instructions directed to: detecting a second user action signifying a request for a peek, the request being associated with one of the at least two multiple sub-window display elements for which the individual sub-window registration information was received; requesting, from the independently-executing application program, in response to the detecting the second user action, a bitmap of the content of the one of the at least two sub-window display elements with which the request was associated; receiving, from the independently-executing application program, the requested bitmap; displaying the single window such that it appears to be transparent; and independently displaying, overlaid over the displayed single window, the received bitmap.

8. The computer-readable storage media of claim 1, wherein the sub-window display elements are tabs.

9. The computer-readable storage media of claim 1, wherein the requesting of the individual thumbnails of the content of the at least two multiple sub-window display elements is only performed in response to the detecting the first user action directed to the task reference.

10. The computer-readable storage media of claim 1, comprising further computer-executable instructions for:
    detecting a second user action directed to a selected one of the individual thumbnails, the selected one of the individual thumbnails being associated with a selected one of the at least two multiple sub-window display elements, the selected one of the at least two multiple sub-window display elements not being concurrently displayed within the single window; and
    generating, in response to the detecting the second user action, an instruction to the application program to make content of the selected one of the at least two multiple sub-window display elements visible in single window.

11. A method of providing individual access to sub-window display elements comprising the steps of:
    displaying a task reference for an independently-executing application program that utilizes multiple of the sub-window display elements within a single window such that content of only one of the multiple sub-window display elements is visible within the single window while content of others of the multiple sub-windows display elements is not concurrently displayed within the single window, each of the multiple sub-window display elements having content provided by the independently-executing application program;
    receiving, from the independently-executing application program, individual sub-window registration information for at least two of the multiple sub-window display elements;
    detecting a first user action directed to the task reference;
    requesting, in a single request, from the independently-executing application program, individual thumbnails of the content of the at least two multiple sub-window display elements for which the individual sub-window registration information was received; and
    displaying a display element proximate to the display of the task reference, the display element comprising the individual thumbnails of the content of the at least two multiple sub-window display elements for which the individual sub-window registration information was received, each of the individual thumbnails being independently user-selectable.

12. The method of claim 11, further comprising the steps of: displaying close indicators associated with the individual thumbnails; detecting a second user action directed to one of the close indicators; identifying one of the multiple sub-window display elements associated with the one of the close indicators; and instructing the independently-executing application program to close the identified one of the multiple sub-window display elements.

13. The method of claim 11, wherein the independently-executing application program utilizes multiple additional sub-window display elements within a second single window such that content of only one of the additional multiple sub-window display elements is visible within the second single window while content of others of the additional multiple sub-windows display elements is not concurrently displayed within the second single window, and wherein further the display element further comprises individual thumbnails of content of at least two of the additional sub-window display elements, the method further comprising the steps of: receiving additional registration individual sub-window information from the independently-executing application program for the two of the multiple additional sub-windows display elements.

14. The method of claim 11, wherein the independently-executing application program utilizes multiple additional sub-window display elements within a second single window such that content of only one of the additional multiple sub-window display elements is visible within the second single window while content of others of the additional multiple sub-windows display elements is not concurrently displayed within the second single window, the method further comprising the steps of: receiving additional individual sub-window registration information from the independently-executing application program for at least two of the multiple additional sub-windows display elements; displaying, in response to the detecting the first user action, a second display element proximate to the display of the task reference, the second display element comprising thumbnails of content of the single window and content of the second single window; and detecting a second user action directed to the thumbnail of the single window; wherein the displaying the display element is in response to the detection of the second user action.

15. The method of claim 11, wherein the requesting of the individual thumbnails of the content of the at least two multiple sub-window display elements is only performed in response to the detecting the first user action directed to the task reference.

16. A user interface generated on a display device by a computing device comprising a user input device, the user interface comprising:

a task reference displayed in an active tasks area of the display device and associated with an application program utilizing multiple sub-window display elements within a single window such that content of only one of the multiple sub-window display elements is visible within the single window while content of others of the multiple sub-windows display elements is not concurrently displayed within the single window, each of the multiple sub-window display elements having content provided by the application program;

a floating display element proximate to the task reference, the floating display element directly comprising individual thumbnails of content of at least two of the multiple sub-window display elements;

the single window, displayed such that it appears to be transparent; and a bitmap of content of one of the multiple sub-windows display elements overlaid over the single window that is displayed such that it appears to be transparent, the one of the multiple sub-window display elements being associated with a selected individual thumbnail, the bitmap of the content being generated independently of the single window.

17. The user interface of claim 16, wherein the task reference is an icon of the application program.

18. The user interface of claim 16, wherein the floating display element further comprises close indicators for the individual thumbnails.

19. The user interface of claim 16, wherein the application program is utilizing multiple additional sub-window display elements within a second single window such that content of only one of the additional multiple sub-window display elements is visible within the second single window while content of others of the additional multiple sub-windows display elements is not concurrently displayed within the second window, the user interface further comprising a second floating display element, independent of the floating display element and proximate to the task reference and the floating display element, the second floating display element comprising thumbnails of content of the single window and the second single window.

20. The user interface of claim 16, wherein the application program is utilizing multiple additional sub-window display elements within a second single window such that content of only one of the additional multiple sub-window display elements is visible within the second single window while content of others of the additional multiple sub-windows display elements is not concurrently displayed within the second single window, and wherein further the floating display element further comprises individual thumbnails of content of at least two of the additional multiple sub-window display elements.

* * * * *